United States Patent [19]

Ellis et al.

[11] 4,119,447

[45] Oct. 10, 1978

[54] METHOD OF REORDERING FIBRES IN A WEB

[75] Inventors: Peter Manfrid Ellis; Charles Martin Lester, both of Harrogate, England

[73] Assignee: Imperial Chemical Industries Limited, London, England

[21] Appl. No.: 784,632

[22] Filed: Apr. 4, 1977

[30] Foreign Application Priority Data

Apr. 8, 1976 [GB] United Kingdom ............... 14369/76

[51] Int. Cl.$^2$ ........................................... B32B 31/20
[52] U.S. Cl. .................................. 156/73.1; 19/161.1; 28/122; 156/168
[58] Field of Search ................. 156/73.1, 148; 28/72.1; 19/161 P

[56] References Cited

U.S. PATENT DOCUMENTS

| | | | |
|---|---|---|---|
| 3,150,416 | 9/1964 | Such | 19/161 P |
| 3,486,168 | 12/1969 | Evans et al. | 19/161 P |
| 3,966,519 | 6/1976 | Mitchell et al. | 156/73.1 |

*Primary Examiner*—Edward G. Whitby
*Attorney, Agent, or Firm*—Cushman, Darby & Cushman

[57] ABSTRACT

Fibres in a web are redistributed by ultrasonic vibration between two rigid members, for example to unite two webs together or to create a pattern of fibre orientation and fibre density; and preferably one of the members is a forwarding roll which forwards the web into a zone of increasing vibration in which fibres are bonded after redistribution.

3 Claims, No Drawings

METHOD OF REORDERING FIBRES IN A WEB

This invention relates to fibrous webs and methods of making them.

Non woven fabrics have commonly been made from fibrous webs of substantially uniform density and thickness in which the fibres are arranged in substantially random manner. Both fibre entanglement and fibre bonding have been used to convert such webs into non woven fabrics, and various methods have been described for bonding in discrete spaced apart areas of the web to give improved fabric properties. However, the combination of strength, stability and drape properties of even these improved bonded fibre fabrics has still been inferior to the corresponding combination of properties of woven or knitted fabrics.

We have now discovered a method of modifying fibrous webs which may be used to make non woven fabrics with still further improved properties. The word "fibre" as used herein means continuous filaments as well as staple fibres, and the word "web" as used herein means a substantially two-dimensional sheet-like arrangement of fibres suitable for conversion into a non woven fabric by a fibre bonding process. The word "web" therefore embraces carded or air laid sheets of staple fibres and sheets of continuous filaments, and lapped and laminated combinations of such sheets. The fibres in a web may have any kind of orientation pattern from random orientation at one extreme to orthogonal layers of parallel fibres at the other extreme. Webs with a high degree of fibre entanglement such as, for example, highly crimped or highly needle punched webs, are less suitable for modification according to the process of the present invention than webs in which the fibre entanglement is only slight.

The present invention provides a method of redistributing at least some of the fibres in one or more webs by causing them to migrate from regions of high fibre vibration to regions of lower fibre vibration when they are ultrasonically excited between opposed faces of two rigid members at least one of which is ultrasonically energised.

Since ultrasonic energy is transmitted effectively by solids and very ineffectively by gases, the vibration of the fibres is greatest in regions where contacts between fibres, and between fibres and the rigid members, are more numerous. Migration of fibres away from these regions to regions of less numerous contacts reduces the number of contacts between the remaining fibres and the faces of the members so that transmission of ultrasonic energy becomes reduced and the probability of further lateral migration of fibre is diminished. Differences in vibration may arise from either a gap of non uniform width between the opposed faces of the rigid members or from the web or webs having a non uniform fibre density. In order to maximise the effectiveness of the process of the invention the fibre density and the spacing between the members should be so chosen in relationship to each other that at those places where the contacts between the fibres and the members are most numerous they are sufficiently numerous to cause significant fibre vibration, while at the same time the fibres are not so tightly held between the members that they are unable to migrate under the influence of the ultrasonic vibration since they would then tend to become bonded to each other rather than to move towards places where the fibre contacts are less numerous.

Two important uses of the present invention are, firstly to create a pattern of areas of different fibre densities and fibre orientations in a previously more uniform and more randomly oriented web; and secondly, to create a more uniform fibre density in a previously non uniform web or webs. This second use of the invention is particularly valuable for unifying webs laid side by side in butt edged.

According to one aspect therefore the present invention provides a process for rearranging the relative positions of fibres in a web to form a pattern of areas of different fibre densities by subjecting the web or webs to an ultrasonic vibration between opposed faces of two rigid members at least one of which is ultrasonically energised and at least one of which bears a relief pattern on its face, whereby at least some fibres are caused to move away from regions where the gap between the faces of the members is less than the maximum and into regions where the gap is greater. This process is particularly valuable as a step in the manufacture of a segmentally bonded non woven fabric from a fibrous web and in a particularly preferred process according to the invention fibres remaining in regions where the gap is less than the average are bonded together within those regions by ultrasonic vibration.

According to another aspect the present invention provides a process for joining together two webs laid side by side in butt edged relationship by subjecting the webs to an ultrasonic vibration between opposed faces of two rigid members at least one of which is ultrasonically energised whereby at least some fibres are caused to move away from regions of relatively high fibre density into adjacent regions of relatively low fibre density whereby the fibre density is unified by fibre migration in the region of the interface between the webs and the webs are interlaced together. Such unifying of webs according to this second aspect of the invention may be effected while at the same time each web is itself being reordered according to the first aspect of the invention.

Methods known in the art of ultrasonic welding of plastics may be used to design a suitable ultrasonically energised member. In a preferred process according to the first aspect of the invention one member is energised and has a flat face while the other, non-energised, member has a patterned face. Patterning may be achieved by any suitable operation such as milling, turning, etching or engraving. Preferably the web is forwarded through the gap by the action thereon of one of the members, for example, the non-energised member may be a roll or a continuous belt.

The surface pattern is preferably an arrangement of isolated lands. The spaces between lands, where the gap is greater than the minimum, should neither be so small that an insignificant proportion of fibres can be accommodated, nor yet so large that only an insignificant proportion of the fibres of the web are reordered. When fibres migrate from zones over lands to spaces between lands they also assume some degree of orientation which depends on the shapes and sizes of the interland spaces.

It will be clear that such wide ranges of fibre type, web structure and patterning are readily available, that the choice of appropriate ultrasonic treatment conditions must be a matter for experimental optimisation in each given situation. It will also be clear that the degree of rearrangement which can be effected in different situations will vary from small to very substantial. For example, stiff and densely entangled fibres are very hard to rearrange while fine and substantially non-entangled fibres are quite easy to rearrange; and moving fibres over small distances into loosely packed regions is relatively easy while moving fibres over large distances into already tightly packed regions is very difficult.

By way of illustration three examples of processes according to the invention will now be described in more detail.

EXAMPLE 1

A web with a weight of approximately 150 g./m² was made from 90 mm. long polyester fibres of 3.3d/tex, 2.7 crimps per cm., a crimp ratio of 36% and a 10% extension at 17 g/dtex; the web being made by conventional carding and cross lapping and needling with 23 punches per sq.cm., both up and down, at 4 mm. needle penetration. A flat rectangular faced duralumin ultrasonic work horn was used with a face 76 mm. by 13 mm. and a nominal gain of 4. It was coupled via two boosters with a combined nominal gain of 5 to the piezo electric transducer of a Dawe ultrasonic welder series 4120. A non-energised driven roller was used to advance the web at 3.75 f.p.m. under the work horn. The roller had a surface pattern of 0.4 mm. square lands at a spacing of 1.6 mm. leaving spaces between lands with a breadth of 1.2 mm. The work horn and roll were maintained in light pressure contact with the web. On examination of the web after this ultrasonic treatment it was found that in at least half of the web thickness the fibres had been substantially rearranged into the pattern of the spaces between the lands without any sign of fibre bonding. Heavier pressure resulted in fibre bonding and lighter pressure resulted in less fibre ordering.

EXAMPLE 2

Continuous bicomponent filaments, having a core of poly(ethylene terephthalate) surrounded by a sheath of a random copolyester of ethylene terephthalate and ethylene isophthalate there being 15 mole percent iso-phthalate groups were melt-spun, cooled by air-quench, a spin finish containing finely divided silica was applied to them, whereafter the filaments were drawn to 3.3 dtex per filament and cut without being crimped into staple fibres having a length of 51 mm. The fibres were opened by carding and formed into a web weighing 150 g.m$^{-2}$ by a Rando Webber machine. A flat, rectangular faced duralumin ultrasonically energised work horn was used with a face 70 mm by 14 mm and a gain of 4. It was coupled to an Intertherm Ltd ultrasonic generator type JU3/7 which had a maximum output of 1 KW. A non-energised driven roller was used to advance the web at 2.5 cm/sec under the work horn. The surface of the roller was patterned with 0.25 mm square lands in a square grid array spaced apart by 1.5 mm. The average depth of the spaces between lands was about 0.8 mm. The ultrasonically energised work horn and the rotating roll were maintained in light pressure contact with the web. On examination of the web after this ultrasonic treatment it was found that the fibres had become reordered into a grid pattern corresponding to the spaces between the lands on the roller and very few fibres remained in the parts of the web corresponding to the square lands on the roller.

The web had however been damaged during transport to the ultrasonically energised horn and roller and had a patchy appearance before and after fibre reordering. In another experiment, the same web was lightly needle-punched (23 needle penetrations per sq.cm. from both sides with 4 mm. depth of penetration) before being subjected to the process of the invention. This treatment ameliorated the patchy appearance previously noted, but the web had a greater number of fibres remaining in areas corresponding to the square lands on the roller than in the previous experiment. Lighter pressure resulted in less fibre rearrangement and heavier pressure also resulted in less fibre rearrangement together with significant bonding in the areas over the lands. In similar experiments with differently dimensioned land patterns it was found that there was less rearrangement of fibres when the spaces between the lands were smaller.

EXAMPLE 3

A thin web comprising 3 denier 100 mm long stable polyester bicomponent fibres in eccentric core sheath configuration with polyethylene terephthalate core and a copolymer of 15% ethylene isophthalate, and 85% ethylene terephthalate as sheath, arranged in a highly parallel arrangement, with fibres having a fine heterofil crimp, was laid in a sandwich with three layers, the top and bottom layers being in the same direction and the middle layer mutually at right angles. Each layer comprised two pieces of web with a gap of about 2 mm between them, the gaps being parallel to the direction of fibre orientation.

The sandwich was fed between a non energised pattern roll and the work horn of Dawe ultrasonic welder, Series 4120, with the direction of the fibres in the outer layers of the sandwich being at right angles to the axis of the roller. The work horn was vibrated with a peak to peak amplitude of about 90$\mu$ and urged against the web with sufficient pressure to bond the web.

On examinaton of the web it was found that the gap between the webs with fibre orientation parallel to the roller axis had disappeared. The gap in the webs perpendicular to the roller axis remained.

EXAMPLE 4

A twistless continuous filament polyester yarn of 2,000 decitex comprising 3 dpf bicomponent filaments in eccentric core sheath configuration with polyethylene terephthalate core and polyethylene isophthalate copolymer sheath, was wound onto a frame with 2 turns per cm in one direction and 2 turns per cm in the perpendicular direction to make a web comprising four layers, the outermost layers being oriented in one direction and the innermost layers in the other direction. The proportion of the area not covered by filament was determined by measuring lineal fractions (Quantitative Stereology — Underwood — Pub. Addison Wesley) at random across the area at a magnification of 4 times. The average area not covered by fibre was 13%.

An Intertherm Ltd ultrasonic generator type JU 3/7 was fitted with a duralumin work horn and booster horn assembly. The peak to peak amplitude of the tip of the work horn was measured by a microscope as 70$\mu$. A non energised driven roller with a plain surface was used to advance the net like web at 1.85 cm/sec under the work horn with the outer layers of yarn in the machine direction. The ultrasonic horn and rotating roll were maintained in light pressure contact with the web. On examination the filaments in the cross direction had almost completely joined up. The filaments in the machine direction had spread but not joined up. The area not covered by filaments was on average 2%. A separate examination of the spread of the filaments in the machine direction only showed that the area uncovered decreased from 56% before ultrasonic treatment to 35% after.

EXAMPLE 5

A laminated web was built up from a central layer of 30 parallel twistless nylon yarns per cm., laid across the machine direction, each yarn comprising 50 filaments each of 4 dtex, this central layer being sandwiched between two outer layers each comprising 15 similar yarns per cm. laid along the machine direction. This was ultrasonically treated while being held under light tension between an ultrasonic work horn and a driven roller. The work horn had a face 200 mm. and 12 mm. wide and was coupled through a booster and horn to a dawe ultrasonic welder series 4120. The roller bore a pattern of parallelogram shaped lands each 1.6 mm. × 0.6 mm. and arranged in parallel rows across the machine direction. The rows were spaced 1.7 mm. apart in the machine direction and the lands in successive rows were spaced at an angle of 45°. Each row itself comprised the longer dimension of the lands separated by 1.3 mm. spaces. The roll was used to advance the web at a speed of about 1 metre per minute under the work horn which was urged towards the roll by an air pressure of 11 psig.

After this ultrasonic treatment it was found that filaments lying across the machine direction were rearranged into parallel bundles lying between the rows of lands and that very few such filaments had remained over the lands between these bundles. By contrast fibres laying along the machine direction could only have moved away from the intense ultrasonic vibration over the lands by assuming a longer tortuous path around them and this was substantially prevented by maintaining a light tension on the web. Fibres lying in the machine direction were bonded in the regions over the lands but it was also very noticeable that in the regions between bonds they had been rearranged from their originally rather bunched form, due to their origin in a set of yarns, to an essentially uniform parallel sheet in which no trace of the original yarn structure remained. In this example therefore fibres lying across the machine direction were redistributed according to the first aspect of the invention while at the same time the fibres lying along the machine direction were unified in density according to the second aspect of the invention, and fibres remaining over the lands were thermally bonded by the heating effect of the ultrasonic vibration so that a segmentally bonded fabric was produced in which the fibres had been substantially rearranged from their initial configurations in the original web.

It will be evident from this last example that the process of the present invention, although it may preceed a bonding step of any kind or indeed a fibre entangling step such as needle punching, is particularly suitable to preceed a thermal bonding step induced by more vigorous ultrasonic vibration. For this purpose the fibrous web must comprise distributed thermally bondable material and it is particularly preferred to use bondable bicomponent filaments. It is possible either to provide separate redistributing and bonding steps in sequence or to provide a single step process in which the web or webs are forwarded through a decreasing gap between the members, to cause redistribution followed by bonding as the gap narrows and the ultrasonic vibration of the fibres increases. This kind of gap and range of vibration are particularly conveniently provided between a non-energised forwarding roll and an energised work horn.

We claim:

1. A method of producing a non-woven fabric from at least one fibrous web containing at least some thermally bondable thermoplastic fibres, the spaces between the fibres in the web being substantially gaseous, comprising forwarding such web or webs into a gap of decreasing width between opposed faces of rigid members which are urged towards each other and at least one of which bears a relief pattern of lands and grooves on its face, and ultrasonically energizing at least one of the members to a degree insufficient to bond the bondable fibres in the entry region of the gap but sufficient to bond such fibres before the web leaves the gap, so that the fibres of the web are at first reordered by their different local degrees of ultrasonic excitation adjacent to the lands and grooves respectively, and so that the bondable fibres are then segmentally bonded in situ by more intense ultrasonic excitation over the lands before leaving the gap.

2. A method according to claim 1 in which one member is a relief patterned forwarding roll.

3. A method according to claim 1 in which the web contains thermally bondable bicomponent filaments and the ultrasonic vibration softens one component and not the other.

* * * * *